March 18, 1958     J. P. SINGER     2,826,926
VARIABLE SPEED CONTROL FOR PHONOGRAPH TURNTABLE DRIVE
Filed Sept. 6, 1955     2 Sheets-Sheet 1
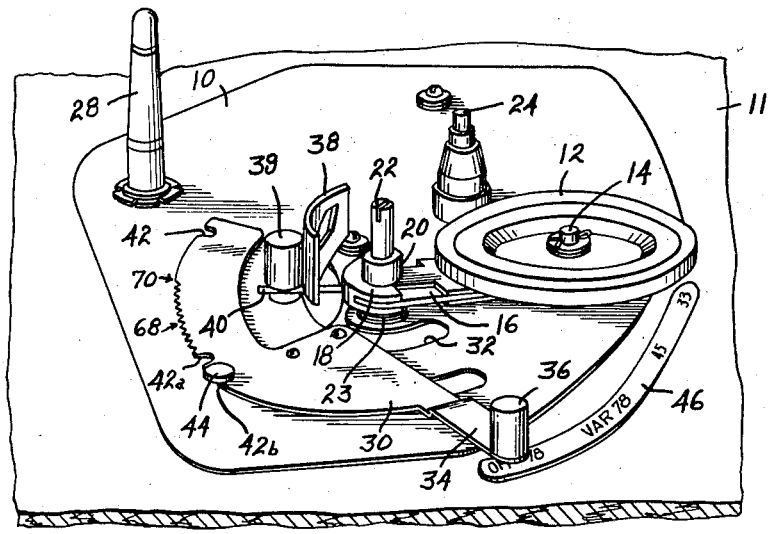
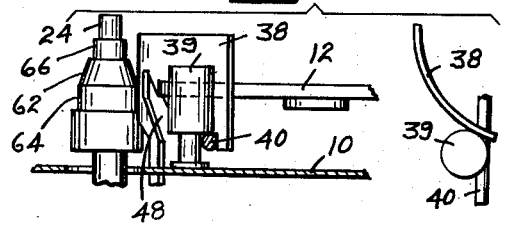
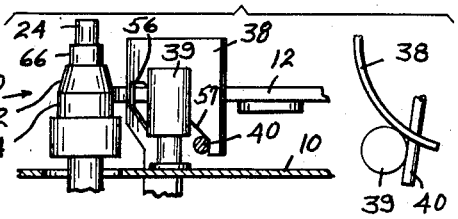
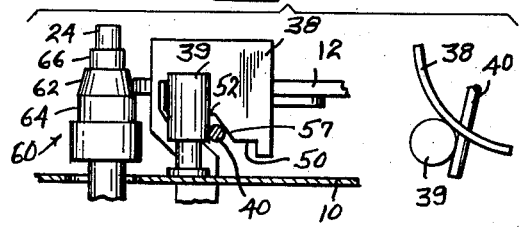
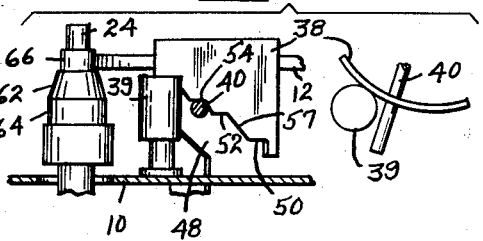
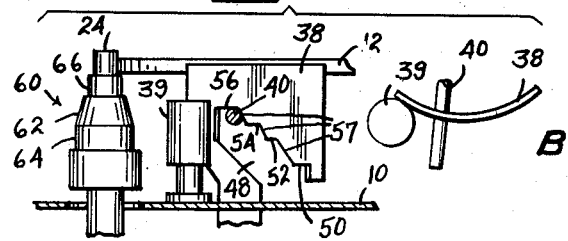
INVENTOR.
JOHN P. SINGER
BY *Morton S. Adler*
ATTORNEY.

March 18, 1958  J. P. SINGER  2,826,926
VARIABLE SPEED CONTROL FOR PHONOGRAPH TURNTABLE DRIVE
Filed Sept. 6, 1955  2 Sheets-Sheet 2
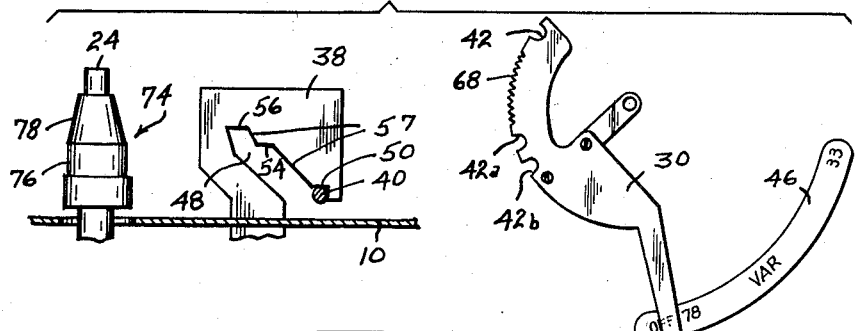
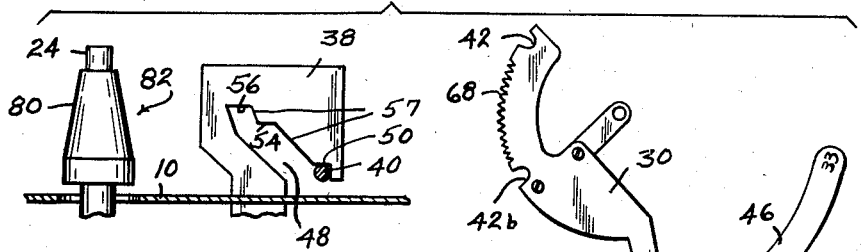
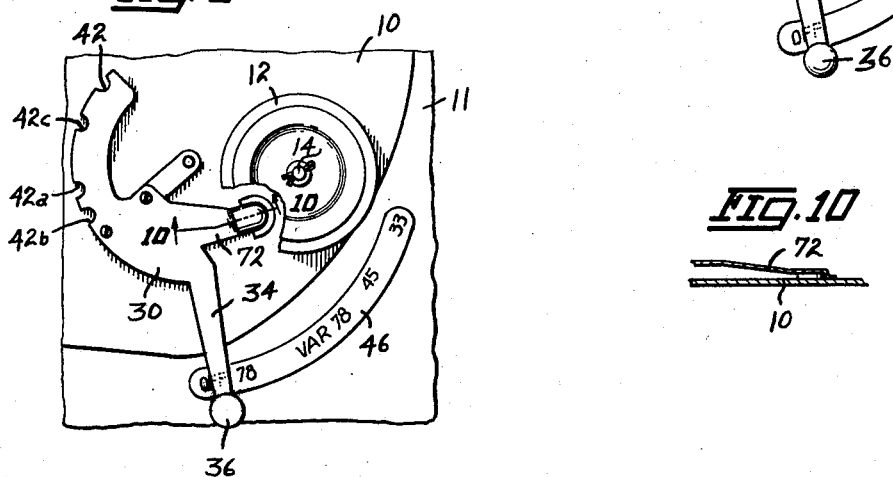
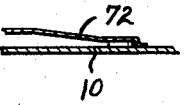
INVENTOR.
JOHN P. SINGER
BY
ATTORNEY.

2,826,926

VARIABLE SPEED CONTROL FOR PHONOGRAPH TURNTABLE DRIVE

John P. Singer, Waterloo, Iowa

Application September 6, 1955, Serial No. 532,668

9 Claims. (Cl. 74—200)

My invention relates to phonograph turntables and more particularly to a variable speed control means as an improvement over the turntable structures disclosed in United States Patents 2,438,265 and 2,438,266 and as improvement and continuation-in-part of my copending application under the same title as above, Serial No. 512,656, field June 2, 1955.

Phonograph turntables are usually constructed to be driven at a set speed or at several different selected speeds. Those disclosed in the two patents mentioned are described as two-speed drives through the actual production models carrying the patent numbers set out and others are actually three-speed drives which is currently in popular favor.

I have found, however, that there are times when these set speeds are not wholly satisfactory and an intermediate speed or one for which the mechanism is not adapted to select is desirable. Such occasions, for illustration, may occur when music is played for certain dance routines where a speed intermediate the 45 and 78 R. P. M. setting or faster than 78 R. P. M.'s is more preferable.

With these observations in mind the instant invention contemplates the adaptation of a variable speed control means applied to the turntable structure of the above two patents identified.

A further object of my invention is to provide a variable speed control means of the above class that is manually operable but which is automatically disengaged by the operation of the usual mechanism provided to change the speed of the turntable to a different speed outside the range of the variable control.

Another object of this invention is to adapt my variable control means to both the high and intermediate speed ranges of a multiple speed phonograph turntable.

These and other objects will be apparent to those skilled in the art.

My invention consists in the construction, arrangements, and combination of the various parts of the device, whereby the objects contemplated are attained as hereinafter more fully set forth, specifically pointed out in my claims, and illustrated in the accompanying drawings, in which:

Fig. 1 is a top side perspective view of a turntable mechanism which carries the Patent Numbers 2,438,265–6 and illustrates a preferred embodiment of my invention applied thereto, Figs. 2–6, inclusive, are enlarged elevational views showing a portion of the control lever, my new pulley and related parts in different stages of adjustment, with a top view insert at the side of each figure to show the relative position of certain parts corresponding to the related figure, Figs. 7 and 8 are enlarged elevational views showing modified structures for my new pulley with an associated control lever portion and also showing a fragmentary portion of other parts of the control lever to illustrate changes for use with the modified pulley, Fig. 9 is a fragmentary top plan view of the control lever showing a modified structure for obtaining a variable speed control for the turntable, and Fig. 10 is a cross sectional view taken on the line 10—10 of Fig. 9.

In describing this invention it will be understood that no invention is claimed in the operation of the turntable per se which is disclosed in Patents 2,438,265–6. Both patents are referred to since an examination of them will show that Figs. 1–9 in said patents are substantially identical. Fig. 1 of this application is presented to show only the turntable generally in order to more fully understand the application of my variable control thereto and while the details of construction of the turntable is disclosed in the patents referred to, a general description of the same is deemed helpful here and is as follows.

A plate 10 for supporting the mechanism to be described will be mountable in any suitable case or chassis 11 in a well known manner. The idler wheel 12 is journalled on an upright post 14 rigidly secured at its lower end to one end of a slide element 16. The other end of element 16 is slidably received in notches in a mount 18. Mount 18 is provided with a hub 20, having a cylindrical bore, and is journalled upon a relatively longer upstanding post 22 by a bearing fit to permit said mount hub 20 to be rotationally and longitudinally reciprocated on post 22. Post 22 also projects below plate 10. A helical spring means 23 is compressively disposed between plate 10 and the underside of mount 18 to yieldingly urge mount 18 upwardly on post 22. An upstanding shaft 24 driven by a motor, not here shown, is mounted on plate 10 near the perimeter of idler wheel 12 and wheel 12 is rotated by engagement therewith. A turntable, not shown here, is carried by a post 28 and has a pendant flange with a cylindrical inner surface for engagement by the periphery of wheel 12. In the patents mentioned, the counterpart of my shaft 24 is provided with different diameters and means are provided for moving the idler wheel 12 into and out of engagement with these different diameters to effect changes in the speed of rotation thereof. My invention contemplates certain changes relative to a pulley for shaft 24 and in the means for moving or controlling the movement of the wheel 12 and this will be better understood by further describing generally the operation of the turntable mechanism.

A hand control lever 30 on plate 10 has an intermediate portion, not here shown, which extends through slot 32 on plate 10 and is rotatably affixed to the lower projecting portion of post 22. Lever 30 has an arm 34 terminating in an upstanding handle 36 which extends outwardly beyond plate 10 and beyond the turntable previously referred to. Integrally formed to the portion of lever 30 which is attached to the lower portion of post 22 is the upstanding flange 38 which in my drawings is the counterpart of flange 79 of the cited patents. My invention embodies certain changes in this element but generally its function is to be moved laterally by lever 30 so that it engages a cam follower in the form of a cylindrical stem 40 which is preferably secured to and affords an extension of the idler wheel mount 18, said stem 40 affording a cam follower adapted to be cammingly moved to different lateral positions and to different levels as a result of lateral translatory movements of the camming lever flange 38 and being guided by lateral engagement with post 39. Thus by movements of lever 30 the mount 18 and idler wheel 12 can be moved upwardly and downwardly relative to the different diameter positions on shaft 24 so that engagement of wheel 12 with these different points affords different speeds of rotation of said wheel. Lever 30 is provided with notches 42, 42a, 42b and 42c engageable respectively by a spring loaded catch 44 and these notches are arranged so lever 30 can be easily set to correspond to fixed points of relationship between wheel 12 and post 24 which are designated by indicia on strip 46. Thus, as shown in Fig. 1 the notches 42, 42a and 42b correspond to the respective positions of 33 and 78 R. P. M.'s and "off," and notch 42c as shown in Fig. 9, to be later described, corresponds to 45 R. P. M.'s. It will be noted that notch 42c as shown in Fig. 9 is not duplicated as such in Fig. 1 although a 45 R. P. M. control point is present in my invention as will later appear. In the operation of this turntable as disclosed in the patents referred to it is pointed out that wheel 12 has certain fixed speeds of rotation which can be selected by movement of lever 30 and the purpose of this invention is to disclose novel means for providing a variable speed control on the turntable disclosed.

To accomplish this result, reference is had first to Figs. 2–6 where the changes in my flange 38 can be easily compared with flange 79 as shown in Figs. 4 and 9 of the cited patents. Flange 38 is so cut as to provide a diagonal slot 48 affording four substantially parallel surfaces, 50, 52, 54, and 56, formed in the upper surface of notch 48. These parallel surfaces are interconnected by the diagonal upper edge 57 of notch 48. Thus formed it will be understood that slot 48 provides a cam action against stem 40 as flange 38 is moved laterally by lever 30 and while this action is disclosed in the other patents I am able to achieve a different result as will appear. Another change I have made is in the provision of pulley 60 mounted to shaft 24 which has a tapered portion 62 intermediate the portions 64 and 66 that are of fixed diameters. Using the shaft 24 to provide a rotation of wheel 12 at 33 R. P. M.'s portion 66 is set for 45 R. P. M.'s and portion 64 for 78 R. P. M.'s, thus allowing surface 62 to permit a variable speed control between the 78 and 45 R. P. M. settings. The surfaces 50, 54 and 56 in the notch 48 provide the three set positions for the respective speeds of wheel 12 of 78, 45 and 33 R. P. M.'s, and surface 52 provides the low speed limiting point of the new position which I have called the 78 variable. It will be appreciated that shaft 24 itself can be tapered to eliminate the need for a separate pulley 60 without in any way departing from the purpose and results obtained as set forth herein.

In the operation of this device as disclosed in the patents mentioned, lever 30 must be moved until the spring loaded catch 44 engages one of the notches 42a–c which will be either in the "off" position or a fixed speed position for the wheel 12. Lever 30 will not ordinarily remain stationary with catch 44 intermediate any of the notches 42a–c as disclosed in the patents cited due to certain spring tension, not here shown, which is applied to lever 30 below plate 10. I have therefore provided on lever 30 a serrated edge or a length of saw teeth like notches 68 extending from notch 42a for 78 R. P. M.'s to and including the area on lever 30 on which notch 42c for 45 R. P. M.'s would normally be, as shown in Fig. 9. Preferably notches 68 are approximately one sixteenth an inch apart but this relationship can be varied to increase or decrease the degree of variability. Thus arranged it will be understood that with lever 30 set at notch 42a for 78 R. P. M.'s (Fig. 3), it can be moved for catch 44 to engage any one of notches 68 whereby rod 40 rides up edge 57 intermediate surfaces 50 and 52 and is guided by post 39 (Fig. 4) until it reaches surface 52 which will be within one or two notches 68 of the farthermost point 70 thereon depending upon the spacing of notches 68. Thereafter, movement of lever 30 to engage catch 44 with notch 68 at point 70 will then move rod 40 to edge 54 for the usual 45 R. P. M. speed. Thus each of the notches 68 will provide a variation of speed as they will hold wheel 12 at different levels on the tapered portion 62 of pulley 60. In other respects, the operation of lever 30 is not dissimilar from the patents referred to and the relative positions as shown are as follows: "Off" in Fig. 2, 45 R. P. M. in Fig. 5 and 33 R. P. M. in Fig. 6. The inserts with each Figure 2–6 show the relative positions of flange 38, rod 40 and post 39 in the positions described.

With reference now to Fig. 9 I have shown a modification in lever 30 to obtain the same variable speed control as just described. As shown in Fig. 9, lever 30 is formed with its regular notches 42a–c for the respective speed positions as described and as pointed out previously, since catch 44 will not with any degree of certainty rest on the edge of lever 30 between the notches 42a–c, I have formed a frictional drag plate 72 as a part of lever 30 which preferably extends away from notches 42a–c with its free end in frictional contact with plate 10 as shown in Fig. 10. This frictional drag is sufficient to overcome the spring tension, not shown, below plate 10 which tends to urge lever 30 into position for catch 44 to engage one of the notches 42a–c. Pulley 60 as described is used with this drag 72 as is also my arrangement of flange 38.

In Figs. 7 and 8 I have illustrated slight variations of the structure shown in Figs. 1–6 as follows. Pulley 74 in Fig. 7 has been formed to taper out the separate 45 R. P. M. position shown on pulley 60 in Fig. 6 by the numeral 66 and thus has the fixed diameter 76 for 78 R. P. M., a tapered portion 78 for a variable speed from 78 R. P. M. to the 33 R. P. M. speed on shaft 24. Correspondingly on flange 38 step or surface 52 has been eliminated and likewise on lever 30 the teeth or notches 68 have been extended considerably closer to the 33 R. P. M. notch 42. On strip 46, the designation "45" can thus be eliminated.

In Fig. 8 the variation described for Fig. 7 has been carried a step further by tapering out a fixed diameter position for 78 R. P. M.'s and thus provides a tapered surface 80 on pulley 82 that will provide at its lowermost point a speed somewhat in excess of 78 R. P. M.'s and at its uppermost point a speed of approximately 45 R. P. M.'s for wheel 12, with shaft 24 providing the 33 R. P. M. speed as before. Flange 38 is the same as in Fig. 7 but on lever 30 notch 42a has been replaced by extending notches 68 over to 42b. On strip 46, the designation "78" may then be eliminated, if desired as the entire range of lever 30 from "off" to 33 R. P. M.'s will be a variable control area.

Some changes may be made in the construction and arrangement of my variable speed control for phonograph turntable drive without departing from the real spirit and purpose of my invention, and it is my intention to cover by my claims, any modified forms of structure or use of mechanical equivalents which may be reasonably included within their scope.

I claim:

1. In a multiple speed adjustment mechanism for phonograph turntables of the class having an upright motor driven shaft provided with axially aligned steps of different diameters, an idler wheel in peripheral engagement with said shaft, a movable mount for said idler wheel, means yieldingly biasing said idler wheel vertically toward the plane of the smaller step, a cam element adapted to be moved laterally in a continuous uniform path, a projection on said mount disposed in the path of movement of said cam element whereby communication of motion from the movement of the cam element is transferred to said idler wheel to effect vertical and horizontal moving efforts on said wheel to engage the periphery thereof at times with different diameters on said shaft for predetermined fixed rates of rotation, and a hand lever connected to said cam element and movable between spaced limits, the combination therewith of a variable speed control means for said idler wheel, comprising, a pulley on said shaft having a surface of varying diameter, a serrated edge on said hand lever, and a yieldable catch means engageable with said serrated edge whereby said hand lever can be positioned at minutely spaced intervals between its limits of travel to selectively engage said idler wheel with different levels on said pulley.

2. In a multiple speed adjustment mechanism for phonograph turntables of the class having a support plate, an upright motor driven shaft mounted on said support plate and having axially aligned steps of different diameters, an idler wheel in peripheral engagement with said shaft, a movable mount for said idler wheel, means yieldingly biasing said idler wheel vertically toward the plane of the smaller step, a cam element adapted to be moved laterally in a continuous uniform path, a projection on said mount disposed in the path of movement of said cam element whereby communication of motion from the movement of the cam element is transferred to said idler wheel to effect vertical and horizontal moving efforts on said wheel to engage the periphery thereof at times with different diameters on said shaft for predetermined fixed rates of rotation, and a hand lever connected to said cam element and movable between spaced limits, the combination therewith of a variable speed control means for said idler wheel, comprising, a pulley on said shaft having a surface of varying diameter, and a frictional drag member on said hand lever in frictional contact with said support plate whereby said hand lever can be positioned at any point between its limit of travel to selectively engage said idler wheel with different levels on said pulley.

3. In a multiple speed adjustment mechanism for phonograph turntables of the class having an upright motor driven shaft provided with axially steps of different diameters, an idler wheel in peripheral engagement with said shaft, a movable mount for said idler wheel, means yieldingly biasing said idler wheel vertically toward the plane of the smaller step, a cam element adapted to be moved laterally in a continuous uniform path, a projection on said mount disposed in the path of movement of said cam element whereby communication of motion from the movement of the cam element is transferred to said idler wheel to effect vertical and horizontal moving efforts on said wheel to engage the periphery thereof at times with different diameters on said shaft for predetermined fixed rates of rotation, and a hand lever connected to said cam element and movable between spaced limits, the combination therewith of a variable speed control means for said idler wheel, comprising, said shaft being tapered to provide varying diameters, and yieldable means associated with said hand lever to hold it at respective minutely spaced intervals between its limits of travel whereby said idler wheel can be selectively engaged with different levels on said shaft to vary the speed of rotation thereof.

4. A device as defined in claim 3 wherein the yieldable means on said hand lever consists of a serrated edge on said hand lever, and a yieldable catch means engageable with said serrated edge.

5. In a multiple speed adjustment mechanism for phonograph turntables of the class having an upright motor driven shaft provided with axially aligned steps of different diameters, an idler wheel in peripheral engagement with said shaft, a movable mount for said idler wheel, means yieldingly biasing said idler wheel vertically toward the plane of the smaller step, a cam element adapted to be moved laterally in a continuous uniform path, a projection on said mount disposed in the path of movement of said cam element whereby communication of motion from the movement of the cam element is transferred to said idler wheel to effect vertical and horizontal moving efforts on said wheel to engage the periphery thereof at times with different diameters on said shaft for predetermined fixed rates of rotation, and a hand lever connected to said cam element and movable between spaced limits, the combination therewith of a variable speed control means for said idler wheel, comprising, said shaft being tapered to provide varying diameters, and yieldable means associated with said hand lever to hold it at any point between its limits of travel whereby said idler wheel can be selectively engaged with different levels on said shaft.

6. In a multiple speed adjustment mechanism for phonograph turntables of the class having a motor driven shaft with a free end portion, an idler wheel in peripheral engagement with said shaft, means yieldingly biasing said idler wheel longitudinally of said shaft towards the free end thereof, the combination therewith of a variable speed control means for said idler wheel, comprising, a pulley on said shaft having a surface of varying diameter with its smaller diameter toward the free end of said shaft, a hand lever operatively connected to said idler wheel for moving the same longitudinally of said shaft and pulley, a serrated edge on said hand lever, and a yieldable catch means engageable with said serrated edge whereby said hand lever can be positioned at minutely spaced intervals between its limits of travel to selectively engage said idler wheel with a different levels on said pulley.

7. In a multiple speed adjustment mechanism for phonograph turntables of the class having a support plate, a motor driven shaft with a free end portion, said shaft mounted on said support plate, an idler wheel in peripheral engagement with said shaft, means yieldingly biasing said idler wheel longitudinally of said shaft towards the free end thereof, the combination therewith of a variable speed control means for said idler wheel, comprising, a pulley on said shaft having a surface of varying diameter with its smaller diameter toward the free end of said shaft, a hand lever operatively connected to said idler wheel for moving the same longitudinally of said shaft and pulley, and a frictional drag member on said hand lever in frictional contact with said support plate whereby said hand lever can be positioned at any point between its limit of travel to selectively engage said idler wheel with different levels on said pulley.

8. In a multiple speed adjustment mechanism for phonograph turntables of the class having a motor driven shaft with a free end portion, an idler wheel in peripheral engagement with said shaft, means yieldingly biasing said idler wheel longitudinally of said shaft towards the free end thereof, the combination therewith of a variable speed control means for said idler wheel, comprising, said shaft being tapered to provide varying diameters with its smaller diameter toward the free end thereof, a hand lever operatively connected to said idler wheel for moving the same longitudinally of said shaft, a serrated edge on said hand lever, and a yieldable catch means engageable with said serrated edge whereby said hand lever can be positioned at minutely spaced intervals between its limits of travel to selectively engage said idler wheel with different levels on said pulley.

9. In a multiple speed adjustment mechanism for phonograph turntables of the class having a support plate, a motor driven shaft with a free end portion, said shaft mounted on said support plate, an idler wheel in peripheral engagement with said shaft, means yieldingly biasing said idler wheel longitudinally of said shaft towards the free end thereof, the combination therewith of a variable speed control means for said idler, wheel, comprising, said shaft being tapered to provide varying diameters with its smaller diameter toward the free end thereof, a hand lever operatively connected to said idler wheel for moving the same longitudinally of said shaft, and a frictional drag member on said hand lever in frictional contact with said support plate whereby said hand lever can be positioned at any point between its limit of travel to selectively engage said idler wheel with different levels on said pulley.

References Cited in the file of this patent

UNITED STATES PATENTS

| | | |
|---|---|---|
| 2,281,665 | Brady | May 5, 1942 |
| 2,438,265 | Metzner | Mar. 23, 1948 |
| 2,438,266 | Ewing | Mar. 23, 1948 |
| 2,634,133 | Carbonneau | Apr. 7, 1953 |

FOREIGN PATENTS

| | | |
|---|---|---|
| 691,774 | Great Britain | May 20, 1953 |